United States Patent
Verhagen et al.

(10) Patent No.: US 11,120,925 B2
(45) Date of Patent: Sep. 14, 2021

(54) INDUCTION HEATING EXTENSION CABLES INCLUDING CONTROL CONDUCTORS

(71) Applicant: Illinois Tool Works Inc., Glenview, IL (US)

(72) Inventors: Paul Verhagen, Appleton, WI (US); Anthony Salsich, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 556 days.

(21) Appl. No.: 15/869,220

(22) Filed: Jan. 12, 2018

(65) Prior Publication Data

US 2018/0204653 A1    Jul. 19, 2018

Related U.S. Application Data

(60) Provisional application No. 62/447,161, filed on Jan. 17, 2017.

(51) Int. Cl.
| | |
|---|---|
| *H01B 9/00* | (2006.01) |
| *H01B 9/04* | (2006.01) |
| *H01B 7/02* | (2006.01) |
| *H01B 7/18* | (2006.01) |
| *H05B 6/14* | (2006.01) |

(Continued)

(52) U.S. Cl.
CPC .......... *H01B 9/003* (2013.01); *H01B 7/0216* (2013.01); *H01B 7/18* (2013.01); *H01B 9/04* (2013.01); *H05B 6/101* (2013.01); *H05B 6/14* (2013.01); *H01B 7/0045* (2013.01); *H05B 6/10* (2013.01)

(58) Field of Classification Search
CPC . H05B 6/06; H05B 6/101; H01B 9/02; H01B 7/303; H01B 9/003; H04B 3/542; H04B 3/546; H04B 2203/5487
See application file for complete search history.

(56) References Cited

U.S. PATENT DOCUMENTS

| 5,777,273 A | * | 7/1998 | Woody .................. H01B 9/003 |
| | | | 174/113 R |
| 7,208,684 B2 | | 4/2007 | Fetterolf, Sr. et al. |

(Continued)

FOREIGN PATENT DOCUMENTS

| CN | 103038016 A | 4/2013 |
| CN | 203165496 U | 8/2013 |

(Continued)

OTHER PUBLICATIONS

European Office Action Appln No. 18151995.0 dated Feb. 11, 2020 (6 pgs).

(Continued)

*Primary Examiner* — Vishal Pancholi
*Assistant Examiner* — Bob Zadeh
(74) *Attorney, Agent, or Firm* — McAndrews, Held & Malloy, Ltd.

(57) ABSTRACT

Induction heating extension cables including control conductors are disclosed. An example cable assembly includes: a first plurality of conductors in a Litz cable arrangement; an outer protective layer configured to protect the plurality of conductors from physical damage; and a second plurality of conductors that are electrically isolated from the first plurality of conductors and are protected by the outer protective layer from physical damage.

20 Claims, 3 Drawing Sheets

(51) Int. Cl.
  *H05B 6/10* (2006.01)
  *H01B 7/00* (2006.01)

(56) References Cited

U.S. PATENT DOCUMENTS

| | | | | |
|---|---|---|---|---|
| 2003/0038130 | A1* | 2/2003 | Thomas | H05B 6/42 |
| | | | | 219/632 |
| 2004/0084443 | A1* | 5/2004 | Ulrich | H05B 6/36 |
| | | | | 219/672 |
| 2004/0164072 | A1* | 8/2004 | Verhagen | H05B 6/06 |
| | | | | 219/667 |
| 2005/0284862 | A1* | 12/2005 | Keishima | H05B 6/1245 |
| | | | | 219/624 |
| 2006/0021787 | A1* | 2/2006 | Fetterolf, Sr. | H01B 7/225 |
| | | | | 174/113 R |
| 2006/0289493 | A1* | 12/2006 | Thomas | H05B 6/101 |
| | | | | 219/660 |
| 2006/0289495 | A1* | 12/2006 | Thomas | H05B 6/06 |
| | | | | 219/677 |
| 2007/0074891 | A1* | 4/2007 | Burke | H01B 7/06 |
| | | | | 174/113 R |
| 2007/0080154 | A1 | 4/2007 | Ott | |
| 2007/0108191 | A1* | 5/2007 | Takagi | G03G 15/2053 |
| | | | | 219/619 |
| 2011/0023610 | A1* | 2/2011 | Ume | G01N 29/4481 |
| | | | | 73/622 |
| 2011/0290765 | A1 | 12/2011 | Albrecht | |
| 2013/0210272 | A1* | 8/2013 | Yuan | H01R 9/0515 |
| | | | | 439/581 |
| 2015/0231680 | A1 | 8/2015 | Jones | |
| 2015/0237680 | A1 | 8/2015 | Ono | |
| 2015/0334780 | A1* | 11/2015 | Beistle | H05B 6/06 |
| | | | | 219/667 |
| 2015/0334784 | A1* | 11/2015 | Carter | H05B 6/101 |
| | | | | 219/676 |
| 2016/0243640 | A1 | 8/2016 | Albrecht | |
| 2017/0004902 | A1 | 1/2017 | Angermann | |
| 2017/0252849 | A1 | 9/2017 | Ryan | |
| 2018/0049277 | A1 | 2/2018 | Salsich | |
| 2018/0110955 | A1* | 4/2018 | Drew | A61M 16/024 |
| 2019/0237219 | A1* | 8/2019 | Lethellier | H01B 9/006 |
| 2020/0361327 | A1* | 11/2020 | Heyne | H01B 7/18 |

FOREIGN PATENT DOCUMENTS

| | | |
|---|---|---|
| CN | 104951691 | 9/2015 |
| CN | 105706007 | 6/2016 |
| EP | 0823766 A1 | 2/1998 |
| WO | 2007035780 | 3/2007 |
| WO | 2015175069 | 11/2015 |
| WO | 2016084112 | 6/2016 |
| WO | 2016099640 | 6/2016 |

OTHER PUBLICATIONS

Int'l Search Report and Written Opinion for PCT/US2019/023587 dated Jun. 11, 2019.
Int'l Search Report and Written Opinion for PCT/US2017/043509 dated Oct. 13, 2017.
Canadian Office Action Appln No. 2,992,042 dated Nov. 22, 2018.
Int'l Search Report and Written Opinion fo PCT/US2017/043509 dated Oct. 13, 2017.

* cited by examiner

INDUCTION HEATING EXTENSION CABLES INCLUDING CONTROL CONDUCTORS

RELATED APPLICATIONS

This patent claims priority to U.S. Provisional Patent Application Ser. No. 62/447,161, filed Jan. 17, 2017, entitled "INDUCTION HEATING CABLES INCLUDING CONTROL CONDUCTORS." The entirety of U.S. Provisional Patent Application Ser. No. 62/447,161 is incorporated herein by reference.

BACKGROUND

Induction heating of workpieces to be welded, such as pipe, often involves arranging a fixture and/or one or more conductive cables in proximity to the workpiece. The power supply that provides induction heating power may be located a substantial distance from the workpiece and/or the fixture, such that measuring heating parameters directly at the power supply is not feasible.

SUMMARY

Induction heating extension cables including control conductors are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
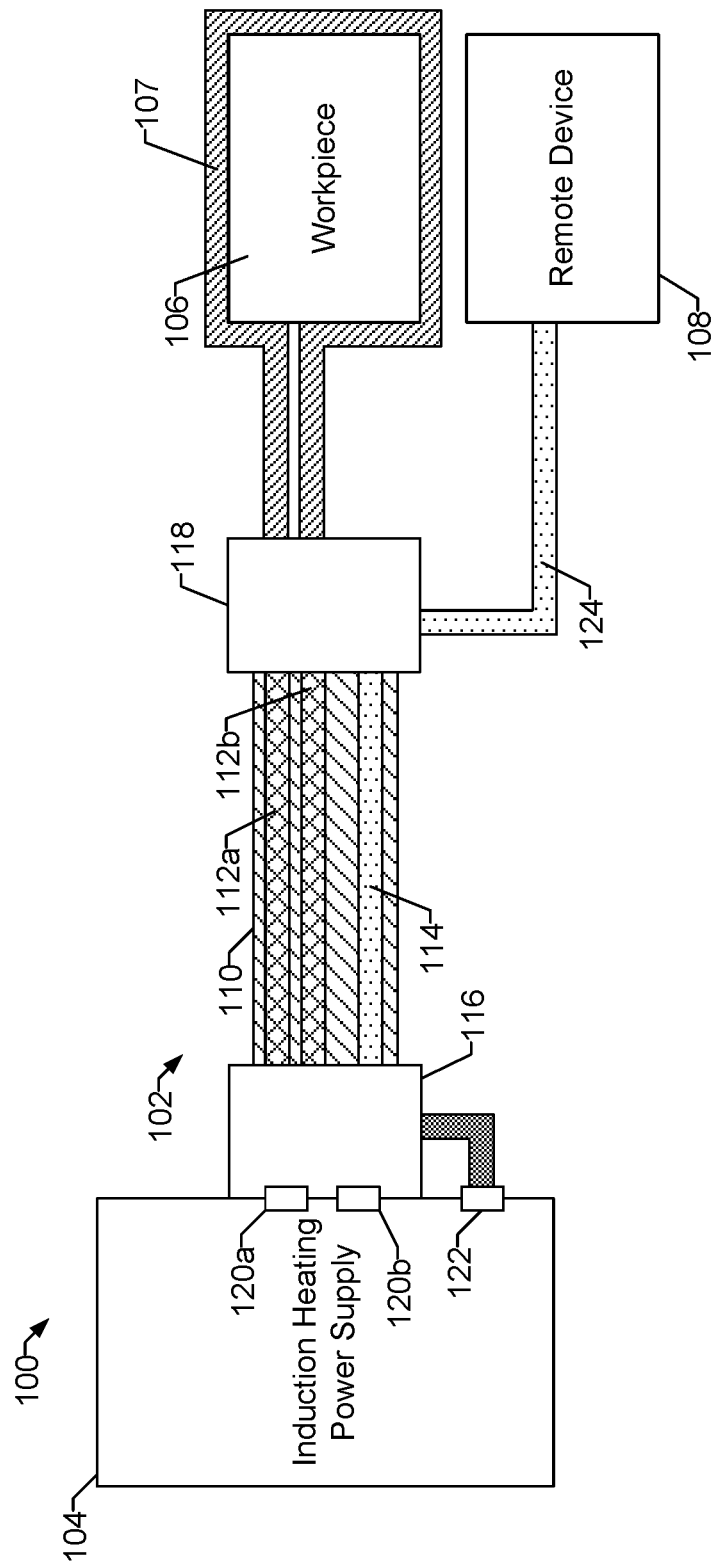
FIG. 1A is a block diagram of an example induction heating system including a cable assembly constructed in accordance with aspects of this disclosure.

Induction heating extension cables deliver induction heating current between an induction heating power supply (e.g., a power supply producing and/or converting induction heating currents) and an induction heating cable (e.g., a cable that is positioned proximate a workpiece such that the induction heating currents induce eddy currents within the workpiece). Induction heating extension cables may have the induction heating current-carrying conductors tightly coupled to reduce (e.g., minimize or eliminate) leakage and improve efficiency.

In contrast with conventional cables, disclosed example extension cables include an additional control cable that transfers data and/or power and that is contained within the outer protective layer of the extension cable (e.g., is not exterior to the extension cable). Disclosed example extension cables couple an induction heating power supply to a remote device, which may be located near the workpiece, to exchange data with the remote device and/or provide power to the remote device. Additionally, disclosed examples may omit electrical isolation measures that may be required when the data is electrically coupled to high-power heating conductors, while being protected by the relatively tough outer jacket or protective layer of the extension cable from physical damage that may occur in a welding-type environment.

Disclosed example cable assemblies include: a first plurality of conductors in a Litz cable arrangement, an outer protective layer configured to protect the first plurality of conductors from physical damage, and a second plurality of conductors that are electrically isolated from the first plurality of conductors and are protected by the outer protective layer from physical damage.

In some example cable assemblies, the second plurality of conductors include a twisted pair of wires. In some example cable assemblies, the second plurality of conductors include coaxial conductors. Some example cable assemblies further include a coupler to couple the first plurality of conductors to an induction heating cable and to couple the second plurality of conductors to an induction heating accessory. In some such examples, the second plurality of conductors conduct at least one of power or data between the induction heating accessory and an induction heating power supply.

In some examples, the first plurality of conductors are configured to conduct induction heating current. In some examples, the first plurality of conductors have a total cross-sectional area of at least 8.37 square millimeters, exclusive of electrical insulation. Some example cable assemblies further include a coupler to couple the first plurality of conductors to an induction heating power supply and to couple the second plurality of conductors to the induction heating power supply. In some such examples, the coupler couples the first plurality of conductors to power connectors of the induction heating power supply. In some examples, the coupler couples the second plurality of conductors to a communication connector of the induction heating power supply.

Disclosed example induction heating systems include an induction heating power supply, a monitoring device remote from the induction heating power supply, and a cable assembly. The cable assembly includes a first plurality of conductors in a Litz cable arrangement, an outer protective layer configured to protect the first plurality of conductors from physical damage, and a second plurality of conductors that are electrically isolated from the first plurality of conductors and are protected by the outer protective layer from physical damage.

In some examples, the second plurality of conductors comprise a twisted pair of wires. In some examples, the second plurality of conductors comprise coaxial conductors. Some example induction heating systems further include a coupler to couple the first plurality of conductors to an induction heating cable and to couple the second plurality of conductors to the monitoring device. In some such examples, the second plurality of conductors conduct at least one of power or data between the monitoring device and the induction heating power supply.

In some example induction heating systems, the first plurality of conductors conduct induction heating current. In some examples, the first plurality of conductors have a total cross-sectional area of at least 8.37 square millimeters, exclusive of electrical insulation. Some example induction heating systems further include a coupler to couple the first plurality of conductors to the induction heating power supply and to couple the second plurality of conductors to the induction heating power supply. In some such examples, the coupler couples the first plurality of conductors to power connectors of the induction heating power supply. In some examples, the coupler couples the second plurality of conductors to a communication connector of the induction heating power supply.

FIG. 1A is a block diagram of an example induction heating system 100 including a cable assembly 102. The heating system 100 includes an induction heating power supply 104 that provides heating power to a workpiece 106 via the cable assembly 102 and an induction heating cable 107. The system 100 further includes a remote device 108. The remote device 108 may be a monitoring device for monitoring the workpiece 106 and/or may be any other type of induction heating accessory.

The cable assembly 102 includes an outer protective layer 110, multiple conductors 112a, 112b in a Litz configuration, and a second set of two or more conductors 114. The Litz conductors 112a, 112b provide current to the heating cable 107. When the heating cable 107 are arranged proximate the workpiece 106 (e.g., wrapped around the workpiece 106, attached to a fixture configured to direct the current to the workpiece 106), the power supply 104 and the heating cable 107 induce Eddy currents into the workpiece 106 to inductively heat the workpiece 106. In some examples, each of the example Litz conductors 112a, 112b may have effective gauge equivalent to American Wire Gauge (AWG) 8 (e.g., a total cross-sectional area of at least 8.37 square millimeters, exclusive of the electrical insulation of the Litz conductors) or larger. In examples in which multiple Litz conductors are used to implement each of the Litz conductors 112a, 112b, the combination of Litz conductors used to implement each of the Litz conductors has an effective gauge equivalent to AWG 8 or larger (e.g., multiple conductors implementing the Litz conductor 112a have a combined total cross-sectional area of at least 8.37 square millimeters, exclusive of the electrical insulation of the Litz conductors, and multiple conductors implementing the Litz conductor 112b have a combined total cross-sectional area of at least 8.37 square millimeters). In still other examples, the combination of the Litz conductors 112a, 112b may have effective gauge equivalent to AWG 8 (e.g., each of the Litz conductors 112a, 112b may have a gauge equivalent less than AWG 8).

The second conductors 114 are contained within the outer protective layer 110 of the cable assembly 102, but is electrically isolated from the Litz conductors 112a, 112b so as to be isolated from the relatively high currents and/or voltages. The example outer protective layer 110 may be constructed using, for example, a thermoplastic polyester elastomer (e.g., Hytrel®), polyurethane and/or any other material and/or combination of materials that provides mechanical and electrical protection to the Litz conductors 112a, 112b and the second conductors 114. The second conductors 114 may deliver power to the remote device 108 and/or exchange data signals between the power supply 104 and the remote device 108. Example implementations of the second conductors 114 include one or more twisted pairs of conductors or one or more coaxial cables. Other implementations may also be used.

The example cable assembly 102 of FIG. 1A further includes a power supply coupler 116 and a heating cable coupler 118. The power supply coupler 116 couples the conductors 112a, 112b to power terminals 120a, 120b (e.g., positive and negative terminals) of the induction heating power supply 104 and/or couples the second conductors 114 to a communications terminal 122 of the induction heating power supply 104. The power terminals 120a, 120b may be studs that transmit the heating power for heating the workpiece 106 via the induction heating cable 107. The example induction heating power supply 104 may exchange data and/or provide power to the remote device 108 via the communications terminal 122. In some examples, the power terminals 120a, 120b and the communications terminal 122 are integrated into the same connector, to which the power supply coupler 116 may connect.

The heating cable coupler 118 couples the conductors 112a, 112b to the induction heating cable 107. The heating cable coupler 118 also couples the conductors 114 to the remote device 108 via external conductors 124. The external conductors 124 may be of the same type as the conductors 114 within the cable assembly 102. For example, if the conductors 114 include twisted pairs of wires, the external conductors 124 may also be twisted pairs of wires. The external conductors 124 may be replaceable so that the appropriate length of external conductors 124 can be used to position the remote device 108 in a desired location.

Figure 1B:
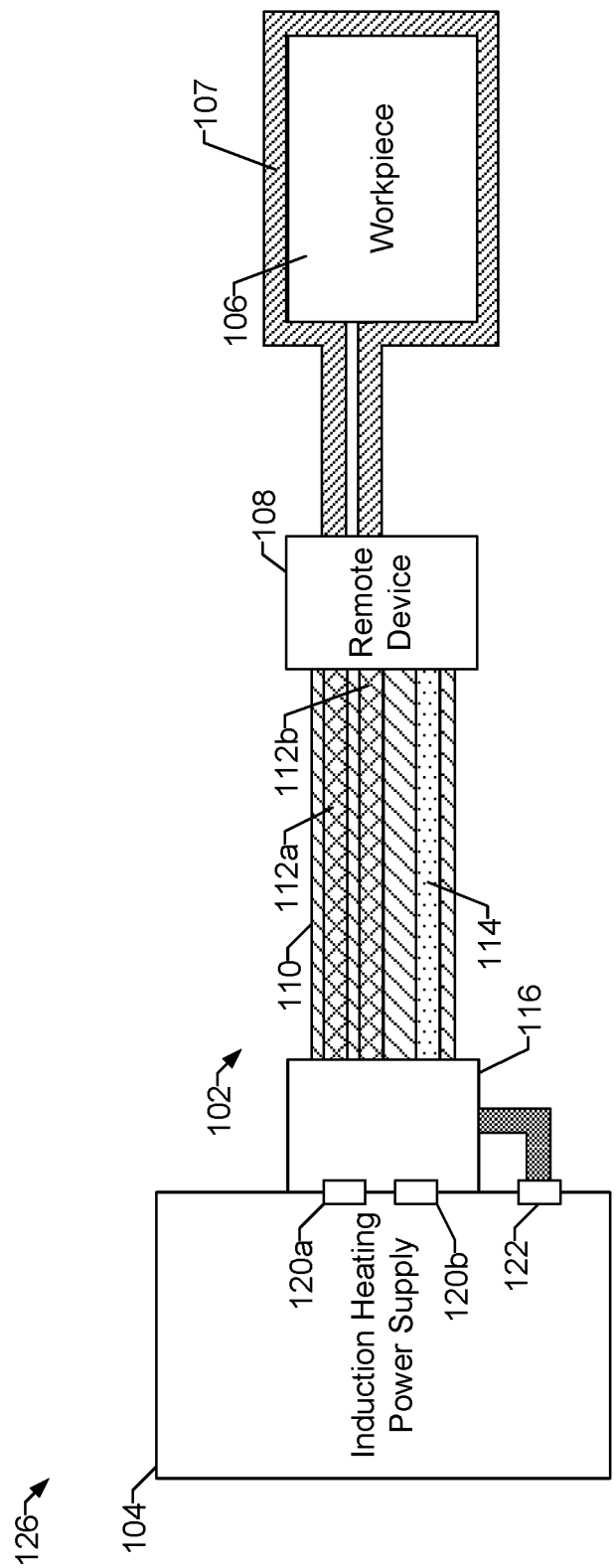
FIG. 1B is a block diagram of another example induction heating system, in accordance with aspects of this disclosure.

FIG. 1B is a block diagram of another example induction heating system 126. The induction heating system 126 of FIG. 1B is similar to the induction heating system 100 of FIG. 1A, and includes the cable assembly 102, the induction heating power supply 104, the workpiece 106, the induction heating cable 107, the remote device 108, the outer protective layer 110, the conductors 112a, 112b in the Litz configuration, the second set of two or more conductors 114, the power supply coupler 116, the power terminals 120a, 120b, and the communications terminal 122.

In contrast with the example system 100 of FIG. 1A, the example system 126 couples the cable assembly 102 to the remote device 108 instead of a heating cable coupler 118. The example remote device 108 receives the power and/or data via the second conductors 114 (e.g., by terminating the second conductors 114). The remote device 108 of FIG. 1B passes the heating power from the conductors 112a, 112b through to the heating cable 107. In some examples, the remote device 108 may include connectors and/or terminations for the conductors 112a, 112b and for the heating cable 107, and include passthrough conductors to connect the conductors 112a, 112b and the heating cable 107.

While example couplers 116, 118 are disclosed, the example cable assembly 102 may be coupled to the induction heating power supply 104, the heating cable 107, and/or the remote device 108 using any combination and/or types of couplers and/or hard wiring.

Figure 2:
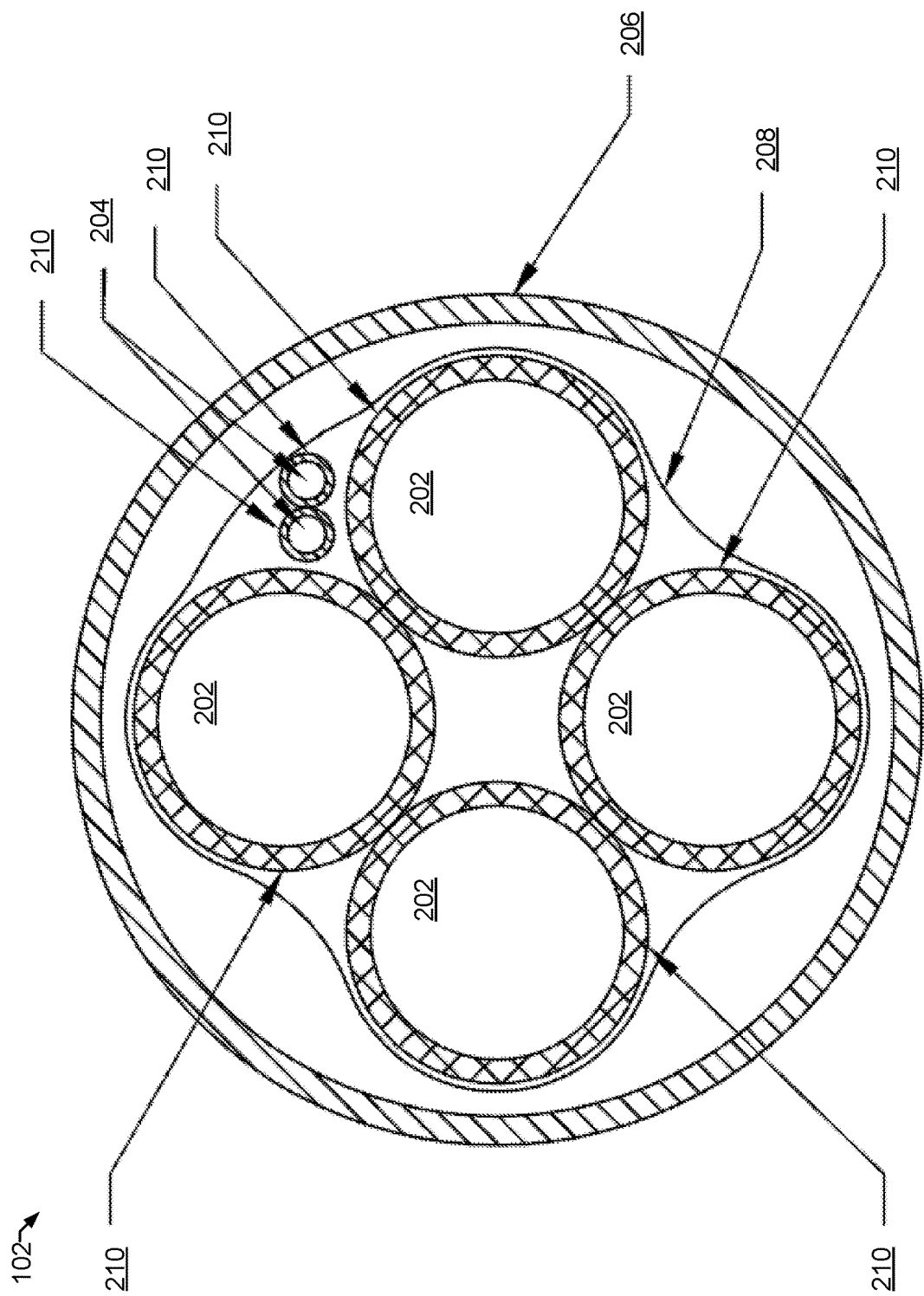
FIG. 2 is an example implementation of the cable assembly of FIGS. 1A and/or 1B.

FIG. 2 is an example implementation of the cable assembly 102 of FIGS. 1A and/or 1B. The example cable assembly 102 includes four Litz wire bundles 202, two conductors 204 arranged in a twisted pair configuration, an outer jacket 206, and an internal wrap 208. Each of the Litz wire bundles 202 and the conductors 204 include an additional jacket 210, which may be constructed of a thermoplastic elastomer (TPE). The example outer jacket 206 is constructed of a thermoplastic polyester elastomer (e.g., Hytrel®), polyurethane and/or any other material and/or combination of materials that provides mechanical and electrical protection to the Litz wire bundles 202 and the conductors 204. The internal wrap 208 may be constructed using polytetrafluoroethylene (PTFE) tape.

As shown in FIG. 2, the outer jacket 206 provides an outer protective layer that protects the Litz wire bundles 202 and the twisted pair conductors 204 from physical damage.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims, both literally and under the doctrine of equivalents.

What is claimed is:

1. A cable assembly, comprising:
    a first plurality of conductor bundles configured to conduct induction heating current, each of the conductor bundles comprising a Litz cable arrangement;
    an inner protective layer, comprising a wrap, around the first plurality of conductor bundles;
    an outer protective layer configured to protect the first plurality of conductor bundles from physical damage; and
    a second plurality of conductors that are electrically isolated from the first plurality of conductor bundles and are protected by the outer protective layer and the inner protective layer from physical damage, wherein the second plurality of conductors are configured to conduct data.

2. The cable assembly as defined in claim 1, wherein the second plurality of conductors comprise a twisted pair of wires.

3. The cable assembly as defined in claim 1, wherein the second plurality of conductors comprise coaxial conductors.

4. The cable assembly as defined in claim 1, further comprising a coupler configured to couple the first plurality of conductor bundles to an induction heating cable and to couple the second plurality of conductors to an induction heating accessory.

5. The cable assembly as defined in claim 4, wherein the second plurality of conductors are configured to conduct the data between the induction heating accessory and an induction heating power supply.

6. The cable assembly as defined in claim 1, wherein the first plurality of conductor bundles have a total cross-sectional area of at least 8.37 square millimeters, exclusive of electrical insulation.

7. The cable assembly as defined in claim 1, further comprising a coupler configured to couple the first plurality of conductor bundles to an induction heating power supply and to couple the second plurality of conductors to the induction heating power supply.

8. The cable assembly as defined in claim 7, wherein the coupler is configured to couple the first plurality of conductor bundles to power connectors of the induction heating power supply.

9. The cable assembly as defined in claim 7, wherein the coupler is configured to couple the second plurality of conductors to a communication connector of the induction heating power supply.

10. An induction heating system, comprising:
    an induction heating power supply;
    a monitoring device remote from the induction heating power supply; and
    a cable assembly, comprising:
        a first plurality of conductor bundles configured to conduct induction heating current, each of the conductor bundles comprising a Litz cable arrangement;
        an inner protective layer, comprising a wrap, around the first plurality of conductor bundles;
        an outer protective layer configured to protect the first plurality of conductor bundles from physical damage; and
        a second plurality of conductors that are electrically isolated from the first plurality of conductor bundles and are protected by the outer protective layer and the inner protective layer from physical damage, wherein the second plurality of conductors are configured to conduct data.

11. The induction heating system as defined in claim 10, wherein the second plurality of conductors comprises a twisted pair of wires.

12. The induction heating system as defined in claim 10, wherein the second plurality of conductors comprises coaxial conductors.

13. The induction heating system as defined in claim 10, further comprising a coupler configured to couple the first plurality of conductor bundles to an induction heating cable and to couple the second plurality of conductors to the monitoring device.

14. The induction heating system as defined in claim 13, wherein the second plurality of conductors is configured to conduct the data between the monitoring device and the induction heating power supply.

15. The induction heating system as defined in claim 10, wherein the first plurality of conductor bundles has a total cross-sectional area of at least 8.37 square millimeters, exclusive of electrical insulation.

16. The induction heating system as defined in claim 10, further comprising a coupler configured to couple the first plurality of conductor bundles to the induction heating power supply and to couple the second plurality of conductors to the induction heating power supply.

17. The induction heating system as defined in claim 16, wherein the coupler is configured to couple the first plurality of conductor bundles to power connectors of the induction heating power supply.

18. The induction heating system as defined in claim 16, wherein the coupler is configured to couple the second plurality of conductors to a communication connector of the induction heating power supply.

19. The induction heating system as defined in claim 10, further comprising:
    a power supply coupler configured to couple the first plurality of conductor bundles to the induction heating power supply and to couple the second plurality of conductors to the induction heating power supply, wherein the induction heating power supply is configured to receive data from the monitoring device and control the induction heating current based on the data; and a heating cable coupler configured to couple the first plurality of conductor bundles to an induction heating cable and to couple the second plurality of conductors to the monitoring device.

20. The induction heating system as defined in claim 10, further comprising a power supply coupler configured to couple the first plurality of conductor bundles to the induction heating power supply and to couple the second plurality of conductors to the induction heating power supply, wherein the induction heating power supply is configured to receive data from the monitoring device and control the induction heating current based on the data, and the monitoring device is directly coupled to the second plurality of conductors and is configured to pass through the induction heating current to an induction heating cable.

* * * * *